United States Patent [19]
Lin

[11] Patent Number: 5,279,110
[45] Date of Patent: Jan. 18, 1994

[54] DOUBLE-ROTOR ROTARY ENGINE AND TURBINE

[76] Inventor: Abraham S. Lin, 11637 Grand NE, Albuquerque, N. Mex. 87123

[21] Appl. No.: 774,316

[22] Filed: Jun. 12, 1992

[51] Int. Cl.[5] .............................................. F02C 5/08
[52] U.S. Cl. ..................................... 60/39.34; 415/148
[58] Field of Search ................ 60/39.34; 415/148, 160

[56] References Cited

U.S. PATENT DOCUMENTS

| 3,025,036 | 3/1962 | Kumm et al. | 415/160 X |
| 4,067,661 | 1/1978 | Gebhart et al. | 415/160 X |
| 4,912,923 | 4/1990 | Lin | 60/39.34 |
| 5,102,298 | 4/1992 | Kreitmeier | 415/148 X |

FOREIGN PATENT DOCUMENTS 1084470  4/1984  U.S.S.R. .................. 415/148

*Primary Examiner*—Michael Koczo

[57] ABSTRACT

A rotary internal combustion engine has a base and a housing rotatably mounted to the base and forming a radial cylinder. An output shaft is rotatably mounted concentrically with the housing and has an arm rigidly extending therefrom. A piston slides in the cylinder for forming a combustion chamber, the piston being operatively connected to the arm. Relative rotational movement between the housing and the output shaft causes the piston to reciprocate in the cylinder. Rotation of the housing is caused by expansion of exhaust gases from the cylinder passing through a turbine which is fixedly connected to the housing. Adjustable stator blades are mounted to the base downstream of the turbine. Stop means are arranged on the shaft for limiting the relative movement between the shaft and the housing. Brake means are arranged on the base and the housing for facilitating starting and stopping sequences of the engine.

2 Claims, 4 Drawing Sheets

DOUBLE-ROTOR ROTARY ENGINE AND TURBINE

BACKGROUND OF THE INVENTION

Conventional engines need a transmission to obtain output power. In order to simplify the complicated structure of the engine, the invented transmission mechanism can use the two-times satisfaction of Newton' Third Law in the double-rotor rotary engine end turbine to adjust the output power relative to the speed of engine, which is caused by a velocity-pressure change of the combustion products passing through the turbine of the engine.

The double-rotor rotary engine and turbine, which was patented in U.S. Pat. No. 4,912,923, has the most important feature that the output power is produced by two-times satisfaction of Newton's Third Law in each explosion stroke. This feature can be caused by the combustion products to move the piston relative to the cylinder and also to make the turbine produce a tangential-force on the rotatable housing which, in turn, takes the role of base to react on the shaft of the engine. Hence, the speed of the engine is in response to the torque reaction between the rotatable housing and the base of the engine as produced by the exhaust turbine, and between the rotatable housing and the shaft of the engine as produced by the expansion of combustion products in the cylinder.

Therefore, the invented transmission mechanism uses said features of the engine to change the speed and pressure of combustion products passing through the turbine for adjusting the output power relative to the speed of the engine without the transmission of conventional engines.

As can be seen from FIGS. 1 to 5, the engine 10 makes use of the combined advantages of the internal combustion engine and the turbine. The two rotors, i.e., housing 14 and shaft 19, of the engine rotate with respect to each other and also relative to the base of the engine, housing 14 having cylinder 13 in it and shaft 19 transmitting the power. The relative angular motion between these two rotors can be held by stoppers 25A and 25B to less than 90°.

Figure 1:
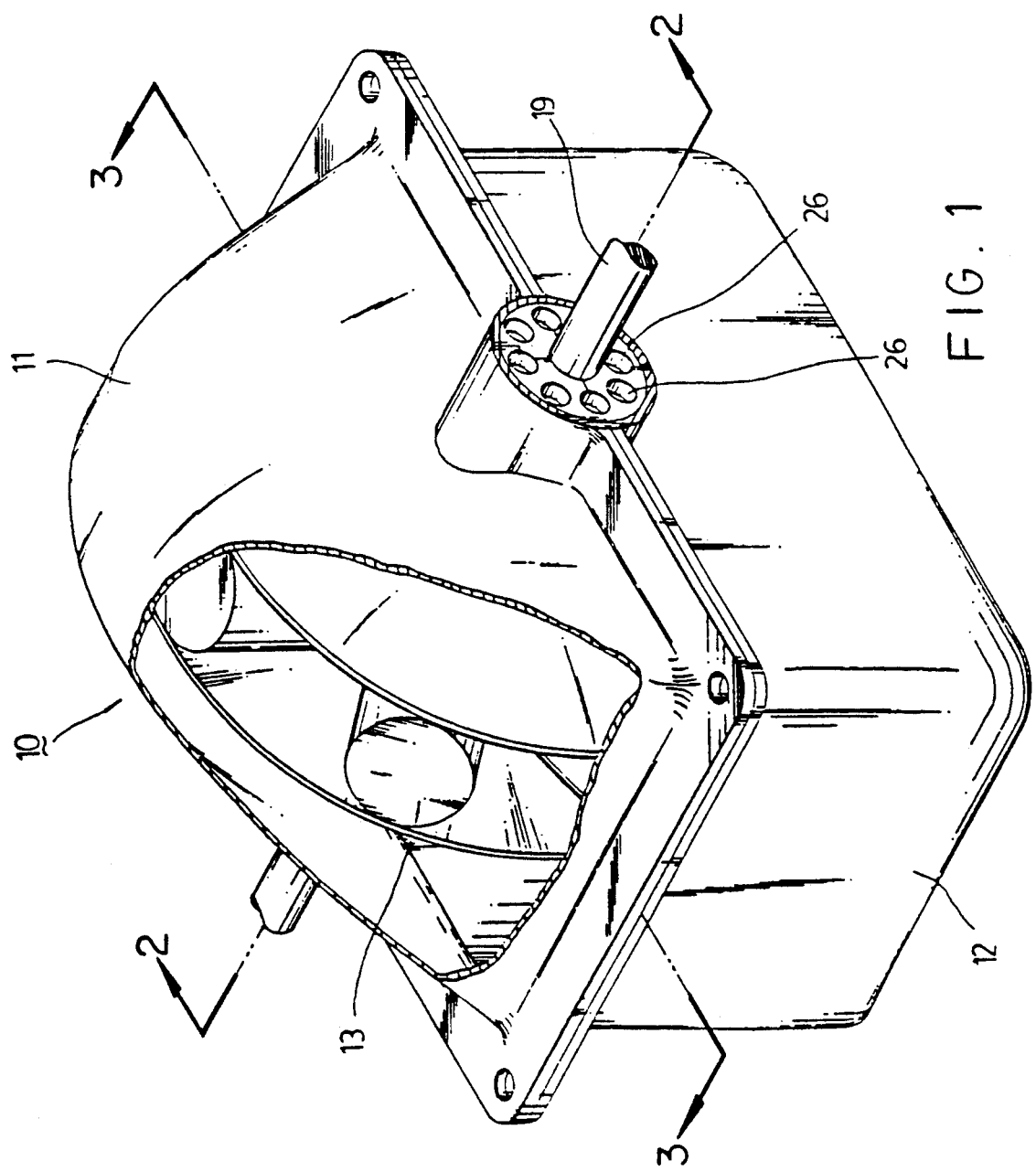
FIG. 1 is a perspective view of the whole engine.

FIG. 1 shows the exterior of the double-rotor rotary engine and turbine 10 which has the rotating part and the base. The rotating part consists of the housing 14 and the shaft 19. Base 22 consists of the cover 11 and the sump 12. Cover 11 is partially cut in order to show the cylinder 13. All of the cylinder 13 is fixed within the housing 14.

Figure 2:
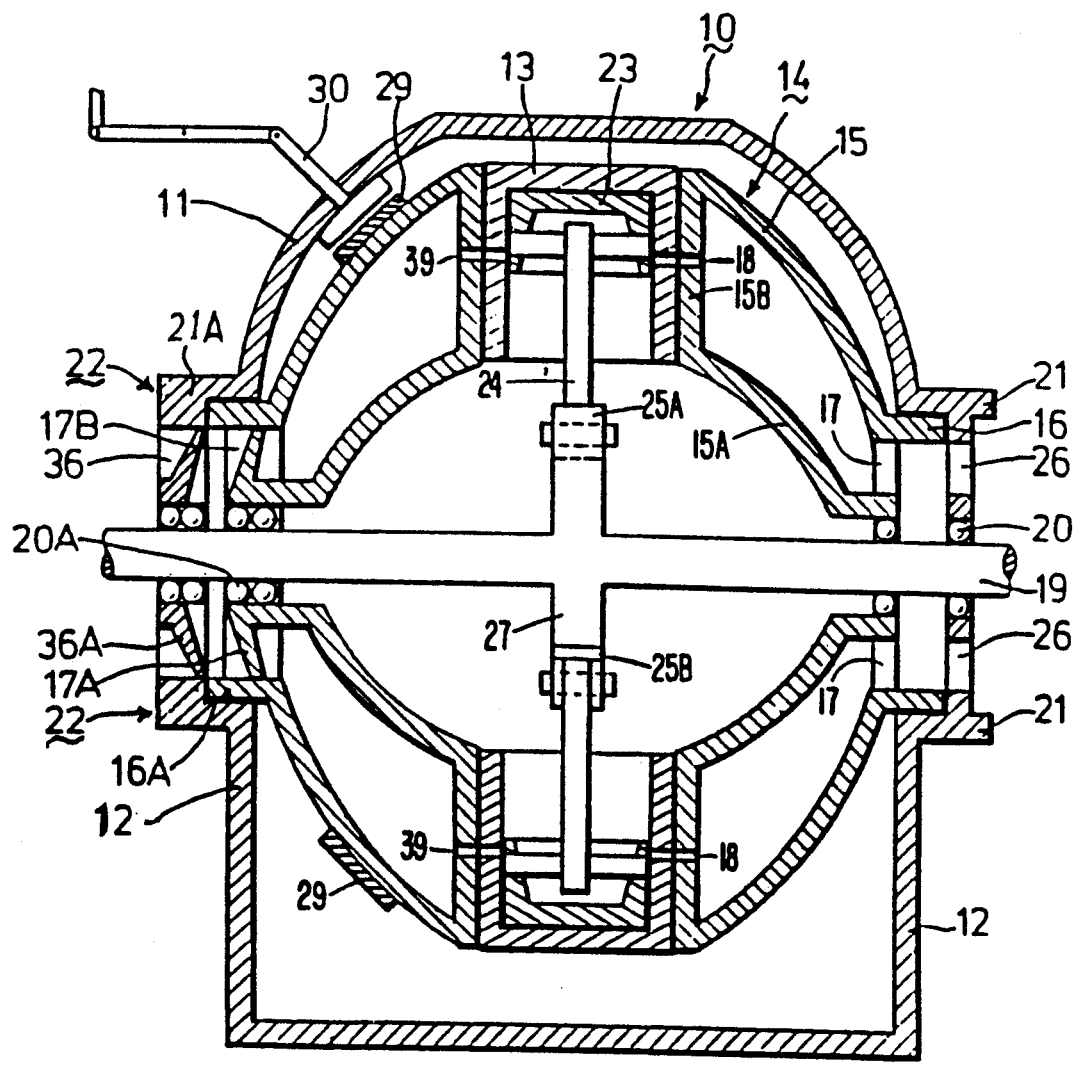
FIG. 2 is a vertical sectional view of the engine along line 2—2 in FIG. 1.

FIG. 2 shows that the housing 14 has two hollow cases, one of which is indicated by the shell plates 15, 15A and 15B. The cylinder 13 is installed between these two hollow cases and rotates together with them. Each cylinder 13 has an inlet 18 which communicates with openings 17 and 26, and an outlet 39 which communicates with openings 17B and 36. Openings 17B and 36, formed by the blades 17A and 36A, take the role of the exhaust turbine. Mixture of fuel-air enters the cylinder 13 from the openings 17, 26 and the inlet 18, and exhausts from the cylinder 13 by the outlet 39 and the openings 17B, 36. The shaft 19 has the arms 27 and is supported by bearing 20 on the base 22. The housing 14 is supported by bearing 20A on the shaft 19. The piston 23 moves relative to the cylinder 13 for forming the combustion chamber and is connected to the shaft 19 by connecting rod 24 and the arm 27. Base 22 has protuberant-parts 21A and 21, the part 21A forms the opening 36 and the part 21 the opening 26. Protuberant-parts 16A and 16 of the housing 14 engage slidingly with the base 22; the part 16A forms the opening 17B and the part 16 the opening 17.

Figure 3:
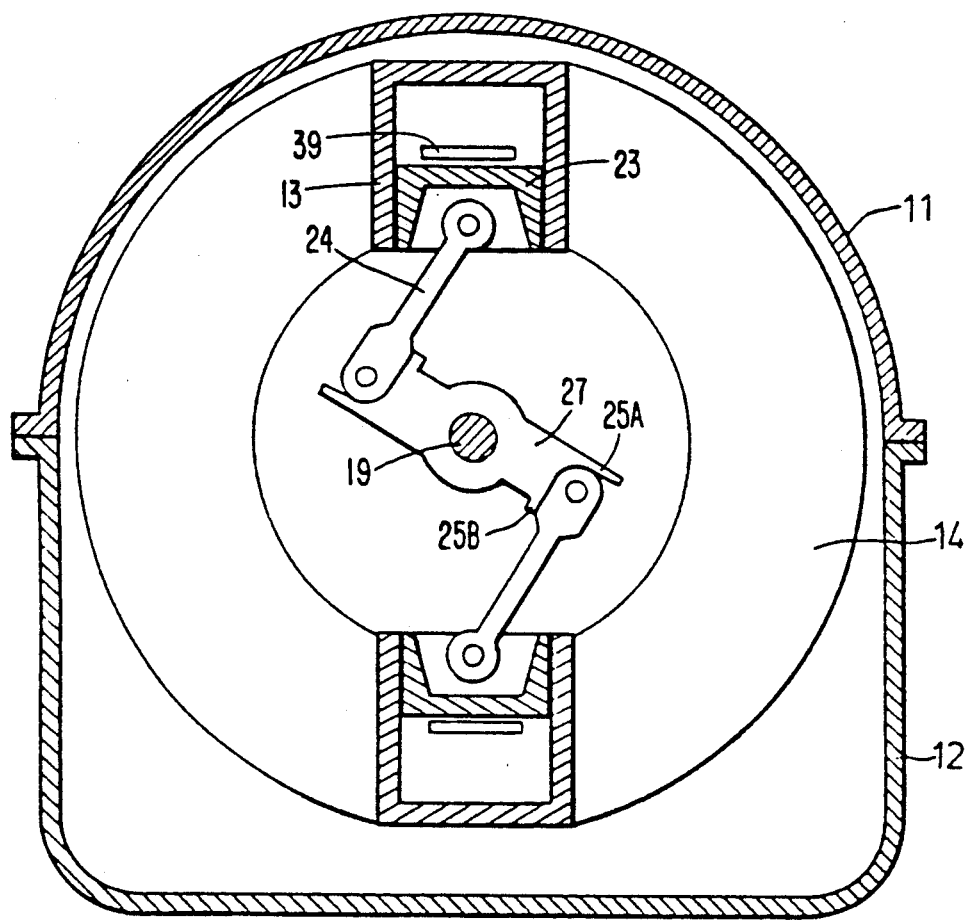
FIG. 3 is a vertical sectional view of the engine along line 3—3 in FIG. 1.

FIG. 3 shows that the stoppers 25A and 25B limit the relative rotation of the shaft 19 and the housing 14 as well as the motion of the piston 23. Hence, two positions of the piston 23 can be adjusted, i.e., piston 23 being at the top dead point and being at the bottom dead point.

Figure 4:
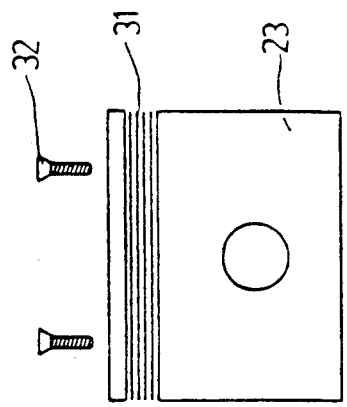
FIG. 4 is a view of the piston used in the engine.

FIG. 4 shows a detailed drawing of the piston 23. A number of gaskets 31 are attached to the piston 23 by the bolts 32. By changing the number of gaskets, the compression ratio can be adjusted for different fuels.

Figure 5:
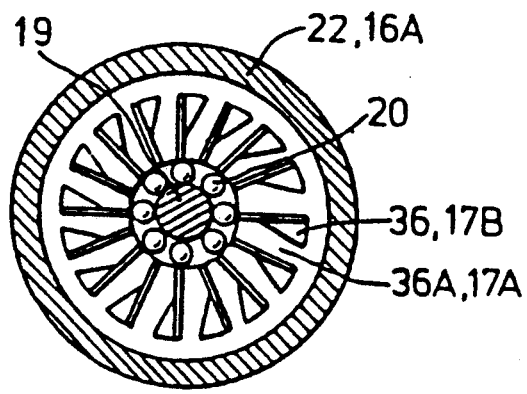
FIG. 5 is a vertical sectional view of the opening of turbine used in the engine.

FIG. 5 shows the structure of the openings 17B and 36 which form the exhaust turbine.

FIG. 2 also shows that on the surface of the shell plate 15, there is the brake device 29 and 30 for facilitating starting and stopping the engine.

Figure 6:
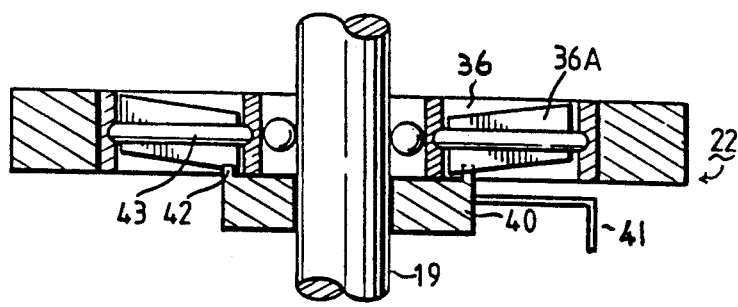
FIG. 6 is a vertical sectional view of the transmission mechanism used in the engine along line 8—8 in FIG. 7.

FIG. 6 shows that transmission mechanism of the engine consists of two parts, one part being formed by an adjustable blade 36A of the turbine and another part being formed by a turning wheel 40 which is operatively mounted on the shaft 19 and engaged with the blade 36A by a cog 42. The blade 36A has a pivot 43 mounted operatively to the opening 36 of the turbine so that gaps between the blades 36A can be adjusted by the turning wheel 40. The adjustable blade 36A acts as the stator of the turbine in response to flow of the combustion products. Handle 41 fixed to the turning wheel 40 controls the motion of transmission mechanism.

Figure 7:
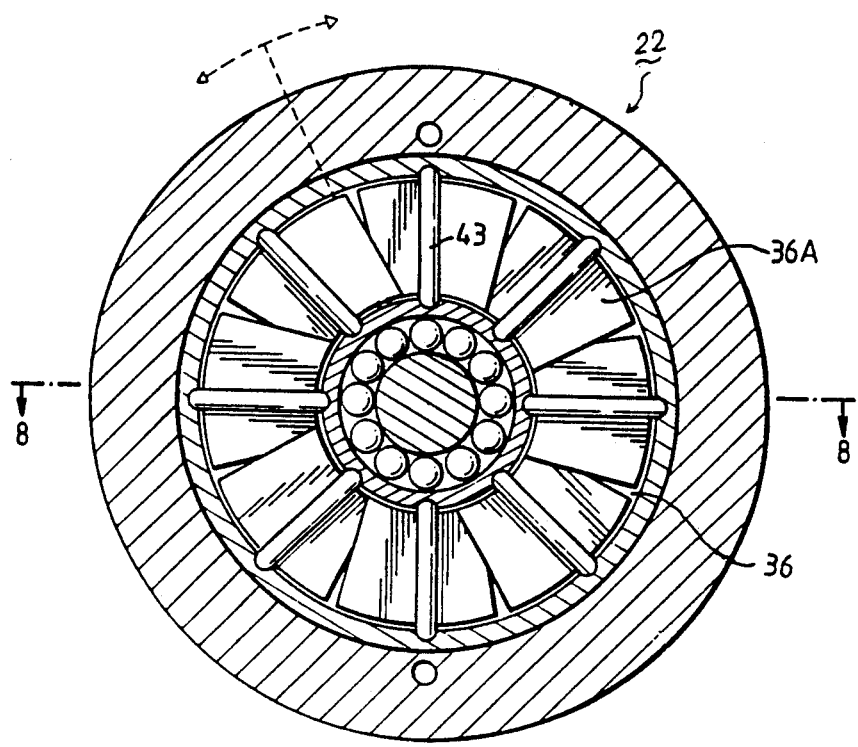
FIG. 7 is a view of the adjustable blade mounted on the turbine opening of the engine.

FIG. 7 shows that blade 36A has the pivot 43 mounted relative to the opening 36 and works as the stator of the turbine.

Figure 8:
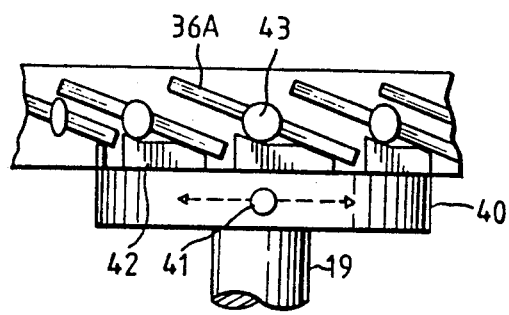
FIG. 8 is a side view of the transmission mechanism used in the engine.

FIG. 8 shows that blade 36A engages with the cog 42 of the turning wheel 40 and the gaps between the blades 36A can be adjusted.

OPERATION

When the engine is stopped, housing 14 is braked by the brake device 29 and 30. When the shaft 19 starts, the piston 23 will move towards the bottom dead point and will open the inlet 18 so that the mixture of fuel-air flows into the cylinder 13. When piston 23 reaches the bottom dead point, the brake on the housing 14 is withdrawn.

While the initial torque continues, the housing 14 begins to move because the piston 23 is positioned in the cylinder 13 which is fixed within the housing 14. As the movement of the engine continues, the housing 14 achieves more momentum than the shaft 19 and will advance so that the piston 23, also with its own centrifugal-force, moves easily from the bottom dead point towards the top dead point. When the movement of the piston 23 closes inlet 18 and the outlet 39, the mixture of fuel-air is compressed. Hence, the compression stroke is completed while the piston 23 reaches the top dead point.

By the predetermined compression ratio which makes the mixture of fuel-air explode, the explosion stroke starts while the piston 23 reaches the top dead point. When the explosion of the mixture occurs as well as the initial torque is withdrawn, piston 23 will move from the top dead point towards the bottom dead point. But, before the exhaust process starts, the shaft 19 pushed by the piston 23 cannot generate effectively the output power. Because, at this time, no tangential-force is produced between the rotating part and the base of the engine so that rotating part is only freely rotating, i.e., Newton' Third Law being not satisfied. As the movement of the piston 23 opens the outlet 39 and the exhaust process starts, the combustion products then pass through the openings 36, 17B and react on the housing 14 with tangential-force because of the turbine effect between the blades 17A, 36A. Therefore, the conservation of momentum does not hold since the tangential-force acting on the housing 14 is not equal to zero, i.e., Newton' Third Law being satisfied for the first time. Furthermore, the housing 14 acted on by the tangential-force, in turn, takes the role of another base to react on the shaft 19, i.e., Newton' Third Law being satisfied for the second time, so that the synthetic output of two-times satisfaction of Newton' Third Law is performed. So, the engine cannot operate effectively without one of these two-times satisfaction in each explosion stroke.

Because of said-above important feature, the speed of the engine is in response to the torque reaction between the housing 14 and the base 22 of the engine as produced by the exhaust turbine, and between the housing 14 and the shaft 19 as produced by the expansion of combustion products in the cylinder 13. Hence, a relative change between the speed and the torque of the engine will be opposite with respect to an equivalent speed of the exhaust. So, when a smaller gap between the adjustable blades 36A is caused by the turning wheel 40 through the cog 42, a lower speed but a higher pressure of the exhaust will react from the blade 36A to the blade 17A so as to produce more tangential force but a lower speed on the housing 14. Vice versa, when a larger gap between the adjustable blades 36A is caused, a higher speed but a lower pressure of the exhaust will produce less tangential-force but a higher speed on the housing 14. Because of the shaft 19 being reacted by the housing 14, the final synthetic output is in accordance with the varied tangential-force and the varied speed of the housing 14 so that the conventional transmission is not needed for the double-rotor rotary engine and turbine.

When the explosion stroke finishes, the piston 23 has reached the bottom dead point and has opened the inlet 18. At this time, the piston 23, because of its own centrifugal-force as well as the greater momentum of the housing 14, moves again from the bottom dead point towards the top dead point, i.e., next compression stroke being proceeded. When the engine needs to stop, the brake device 29 and 30 can be used to help because the freely rotating part of the engine keeps a larger inertia momentum.

I claim:
1. A double-rotor rotary engine and turbine comprising:
 (a) a base;
 (b) an housing rotatably mounted to the base and forming a radial cylinder;
 (c) an output shaft rotatably mounted concentric with the housing and having an arm rigidly extending therefrom within the housing;
 (d) a piston slidingly engaging the cylinder and forming a combustion chamber with the cylinder, the piston being operatively connected to the arm for movement between the housing and the output shaft;
 (e) means for admitting a fuel-air mixture into the cylinder;
 (f) means for releasing combustion products from the cylinder following operation of the expanding means;
 (g) turbine means operatively connected between the base and the housing, the turbine means providing the torque reaction against the housing in response to flow of the combustion products from the releasing means;
 (h) stop means on the shaft for limiting the relative movement between the shaft and the housing, between the first position wherein the piston is radially extended within the cylinder and the second position wherein the piston is retracted toward the shaft; and wherein
 (i) the base is stationary;
 (j) the housing forming a plurality of spaced cylinders, each cylinder having a corresponding shaft-connected piston;
 (k) the piston moving symmetrically in unison within the respective cylinder in response to the relative rotational movement of the output shaft;
 (l) the connection of the piston to the arm being by a connecting rod, the rod being pivotally connected at opposite ends thereof to the piston and the arm, respectively;
 (m) the turbine means comprising a rotor fixed relative to the housing and a stator fixed relative to the base;
 (n) the first position of the shaft locating the piston proximately at the top dead center relative to the cylinder;
 (o) the relative movement between the housing and the shaft being less than about 90 degrees;
 (p) brake means for holding the housing fixed relative to the base for facilitating a starting and a stopping sequences of the engine; and further comprising:
 (q) a transmission mechanism formed by two parts for adjusting gaps between adjustable blades of the turbine means in response to flow of the combustion products from the releasing means for performing the output without a conventional transmission, one part forming the adjustable blades mounted operatively to the base of the engine with a pivot as the stator of the turbine means and adjusted by a turning wheel for the gaps, and another part forming the turning wheel mounted on the shaft of the engine and engaged with the adjustable blades by a cog.

2. The double-rotor rotary engine and turbine of claim 1 wherein the transmission mechanism has a handle fixed to the turning wheel for controlling the motion of the transmission mechanism.

* * * * *